(12) United States Patent
Smith

(10) Patent No.: US 12,723,365 B2
(45) Date of Patent: Sep. 1, 2026

(54) BEARING ASSEMBLY FOR DRIVESHAFTS OF DRAGLINES

(71) Applicant: Caterpillar Global Mining LLC, Tucson, AZ (US)

(72) Inventor: Philip Craig Smith, Beaconsfield (AU)

(73) Assignee: Caterpillar Global Mining LLC, Tucson, AZ (US)

(*) Notice: Subject to any disclaimer, the term of this patent is extended or adjusted under 35 U.S.C. 154(b) by 386 days.

(21) Appl. No.: 18/523,983

(22) Filed: Nov. 30, 2023

(65) Prior Publication Data

US 2025/0179763 A1 Jun. 5, 2025

(51) Int. Cl.

| | |
|---|---|
| ***F16C 19/38*** | (2006.01) |
| ***E02F 3/48*** | (2006.01) |
| ***E02F 3/58*** | (2006.01) |
| ***E02F 9/12*** | (2006.01) |
| ***F16C 19/54*** | (2006.01) |

(Continued)

(52) U.S. Cl.

CPC .................. *E02F 3/48* (2013.01); *E02F 3/58* (2013.01); *E02F 9/123* (2013.01); *F16C 19/381* (2013.01); *F16C 19/545* (2013.01); *F16C 19/56* (2013.01); *F16C 23/086* (2013.01); *F16C 35/063* (2013.01); *F16C 35/067* (2013.01);

(Continued)

(58) Field of Classification Search

CPC ...... F16C 19/38; F16C 19/381; F16C 19/545; F16C 19/56; F16C 23/08; F16C 23/086; F16C 35/063; F16C 35/067; F16C 35/073; F16C 35/077; F16C 2300/14; F16C 2350/26; E02F 3/48; E02F 3/58; E02F 9/123

See application file for complete search history.

(56) References Cited

U.S. PATENT DOCUMENTS 4,263,706 A * 4/1981 Smith, Sr. ............... B23C 1/007 29/445
5,433,536 A 7/1995 Bergling (Continued)

FOREIGN PATENT DOCUMENTS

CN 2313683 Y * 4/1999 ............ F16C 19/545
CN 108163731 A 6/2018

(Continued)

OTHER PUBLICATIONS

Description_CN108163731A.*

*Primary Examiner* — Phillip A Johnson

(57) ABSTRACT

A bearing assembly for a driveshaft that facilitates a swinging movement of a frame of a dragline with respect to a base of the dragline. The bearing assembly includes a housing, a spherical bearing, and a thrust bearing. The housing is fixedly engageable with the frame and defines a cavity to provide rotatable passage to the driveshaft therethrough. The spherical bearing is engageable with each of the housing and the driveshaft for journaling the driveshaft in the cavity and facilitating a rotation of the driveshaft about a longitudinal axis and an angulation of the driveshaft with respect to a reference axis. The thrust bearing is configured to be supported against each of the driveshaft and the housing to accommodate the angulation of the driveshaft and an axial load passing along the longitudinal axis away from the spherical bearing onto either of the housing or the frame.

20 Claims, 3 Drawing Sheets

(51) Int. Cl.

| | |
|---|---|
| ***F16C 19/56*** | (2006.01) |
| ***F16C 23/08*** | (2006.01) |
| ***F16C 35/063*** | (2006.01) |
| ***F16C 35/067*** | (2006.01) |
| ***F16C 35/073*** | (2006.01) |
| ***F16C 35/077*** | (2006.01) |

(52) U.S. Cl.
CPC .......... *F16C 35/073* (2013.01); *F16C 35/077* (2013.01); *F16C 2350/26* (2013.01)

(56) References Cited

U.S. PATENT DOCUMENTS 6,170,991 B1 * 1/2001 Manne .................. F16C 35/063 384/563
2003/0198416 A1 * 10/2003 Borowski ........... F16C 33/7886 384/477
2011/0067275 A1 * 3/2011 Doan ........................ E02F 3/58 37/396

FOREIGN PATENT DOCUMENTS

| | | | | |
|---|---|---|---|---|
| CN | 108163731 | B | 1/2020 | |
| DE | 19937040 | A1 * | 3/2001 | ............ F16C 19/545 |
| EP | 0916862 | B1 | 6/2004 | |
| JP | H08240247 | A | 9/1996 | |
| JP | 2002213439 | A | 7/2002 | |
| JP | 2010013805 | A | 1/2010 | |
| JP | 4837508 | B2 | 12/2011 | |
| KR | 101324488 | B1 | 11/2013 | |
| WO | 2013162436 | A1 | 10/2013 | |

* cited by examiner

BEARING ASSEMBLY FOR DRIVESHAFTS OF DRAGLINES

TECHNICAL FIELD

The present disclosure relates to a machine, such as a dragline, having a frame and a base. More particularly, the present disclosure relates to a bearing assembly for a driveshaft of the dragline that facilitates a swinging movement of the frame with respect to the base.

BACKGROUND

Machines, such as draglines, mining shovels, hydraulic excavators, and the like, typically include structures that rotate or swing relative to one another, e.g., to facilitate performance of excavation operations. In the case of a dragline, for example, a frame (also referred to as a revolving frame) is rotatably mounted atop a base such that the frame may rotate relative to the base. Such a machine typically includes a power source (which may be supported on the frame) to power the rotation or swinging of the frame with respect to the base. In this regard, a driveshaft with a pinion may extend from the power source and engage with a rack of the base such that a motion imparted to the pinion by the power source may rotate or swing the frame relative to the base. A bearing assembly is typically employed to rotatably couple the driveshaft to the frame. A load, attributed by factors such as a weight of the driveshaft, etc., often subjects surrounding components, such as the bearing assembly, with stress that can potentially reduce an overall usable life of the surrounding components.

Chinese Publication No.: 108,163,731 relates to a supporting device. The supporting device comprises a lower pedestal, a self-aligning thrust roller bearing, a self-aligning roller bearing, a first upper pedestal and a second upper pedestal. The lower pedestal is provided with a first inner chamber, in which the self-aligning thrust roller bearing is located; the outer ring of the self-aligning thrust roller bearing is installed at the inner wall of the bottom of the first inner chamber; the first upper pedestal is annular, is located in the first inner chamber, and is arranged relatively to the lower pedestal at an interval; the outer wall of the bottom of the first upper pedestal is provided with a first step front edge, the top surface of which is vertical to a central line of the first upper pedestal; an inner ring of the self-aligning thrust roller bearing is installed at the first step front edge, and an end of the inner ring of the self-aligning thrust roller bearing abuts against the top surface of the first step front edge.

SUMMARY OF THE INVENTION

In one aspect, the disclosure is directed towards a bearing assembly for a driveshaft that facilitates a swinging movement of a frame of a dragline with respect to a base of the dragline. The bearing assembly includes a housing, a spherical bearing, and a thrust bearing. The housing is fixedly engageable with the frame and defines a cavity to provide rotatable passage to the driveshaft therethrough. The spherical bearing is engageable with each of the housing and the driveshaft for journaling the driveshaft in the cavity and facilitating a rotation of the driveshaft about a longitudinal axis and an angulation of the driveshaft with respect to a reference axis. The thrust bearing is configured to be supported against each of the driveshaft and the housing to accommodate the angulation of the driveshaft and an axial load passing along the longitudinal axis away from the spherical bearing onto either of the housing or the frame.

In another aspect, the disclosure relates to a dragline. The dragline includes a base and a frame disposed above the base. The dragline also includes a power system including a driveshaft to facilitate a swinging movement of the frame with respect to the base. The dragline further includes a bearing assembly for the driveshaft. The bearing assembly includes a housing, a spherical bearing, and a thrust bearing. The housing is fixedly engageable with the frame and defines a cavity to provide rotatable passage to the driveshaft therethrough. The spherical bearing is engageable with each of the housing and the driveshaft for journaling the driveshaft in the cavity and facilitating a rotation of the driveshaft about a longitudinal axis and an angulation of the driveshaft with respect to a reference axis. The thrust bearing is configured to be supported against each of the driveshaft and the housing to accommodate the angulation of the driveshaft and an axial load passing along the longitudinal axis away from the spherical bearing onto either of the housing or the frame.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
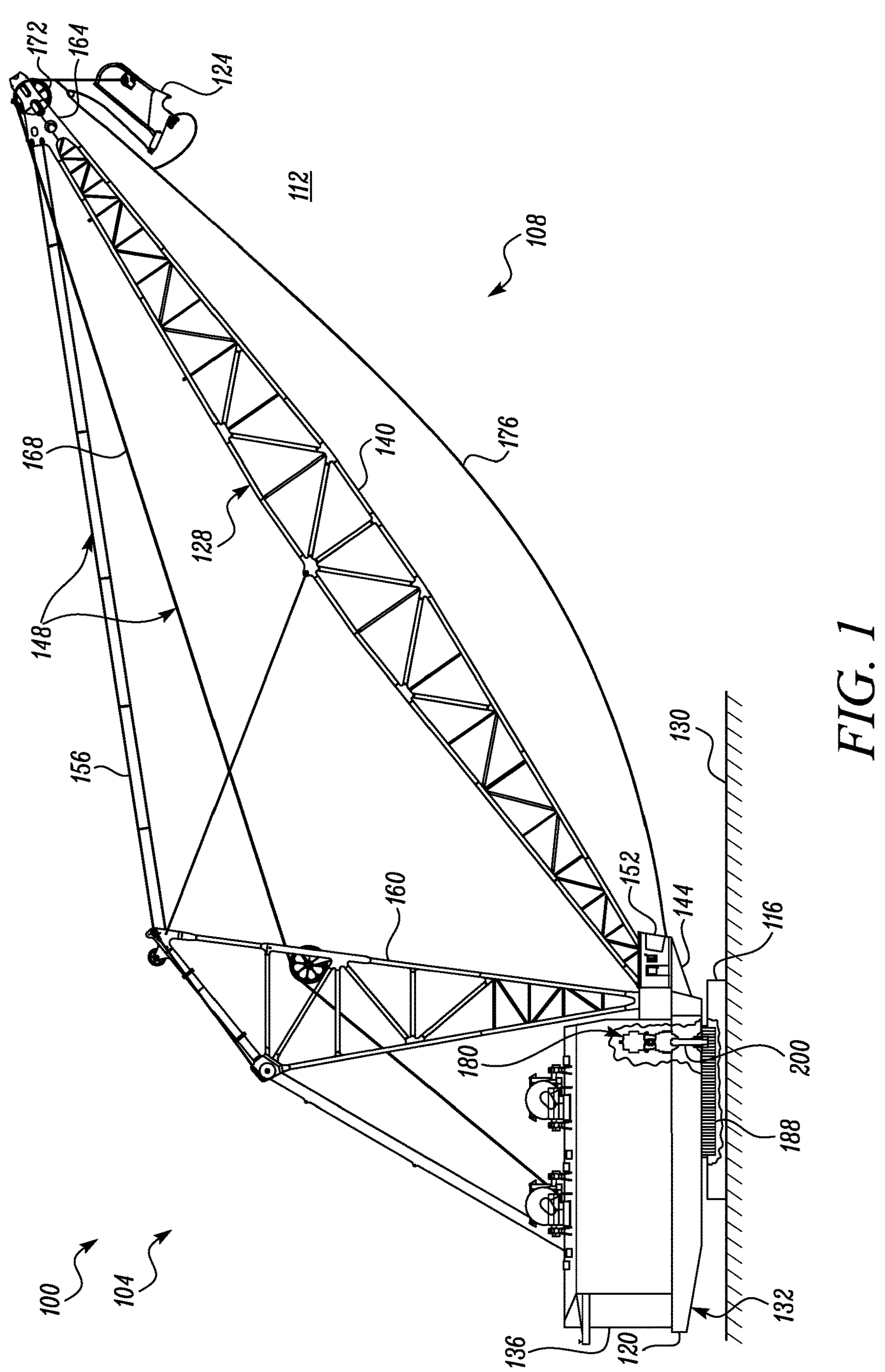
FIG. 1 is a side view of an exemplary work machine, such as a dragline, operating at a worksite, in accordance with an embodiment of the present disclosure.

Referring to FIG. 1, an exemplary work machine, e.g., work machine 100, is shown and described. The work machine 100 may be an excavation machine 104, such as a dragline 108. The work machine 100 may be employed at a worksite 112, which, although not limited to, may include a mining site, or a similar site, in which quantities of materials (e.g., soil, minerals, debris) may need to be transferred from one location to another location. Although references to the dragline 108 are used in the present disclosure, aspects of the present disclosure may be applied to multiple other excavating machines, such as hydraulic excavators, shovels, and other work machines that may have structures rotating or swinging relative to one another. The dragline 108 may include a base 116, a frame 120 (which is also commonly referred to as a 'revolving frame'), a bucket 124, and a boom system 128.

The base 116 may be positioned on a surface 130 (e.g., a ground surface) of the worksite 112 and the frame 120 may be disposed above the base 116 to be rotatably mounted atop the base 116. In other words, the base 116 may rotatably support the frame 120. The frame 120, at least in part, may be counterweighted (e.g., see counterweight portion 132) to balance out a load handled by the work machine 100 (e.g., by the bucket 124 of the work machine 100) during operations. Further, an enclosure 136 may be provided over the frame 120. The enclosure 136 may include and/or enclose various operating machinery, controls, one or more power sources, and the like devices and systems, as is customarily available or present in a dragline.

The boom system 128 may include a boom 140. The boom 140 may be pivotally connected to the frame 120 (e.g., towards a front end 144 of the frame 120) such that the boom 140 can pivot vertically (e.g., along a vertical plane) relative to the frame 120. A pivotable coupling of the boom 140 relative to the frame 120 may be attained by way of knuckles (not shown) as may be customary, and which may be provided on the frame 120.

The boom system 128 may include a rope mechanism 148 for moving and/or operating the bucket 124. In this regard, the bucket 124 may be suspended from an end 164 of the boom 140 by a hoisting rope 168 of the rope mechanism 148. The bucket 124 may be a scoop, which may be dragged through a material bank to be filled with a load. When the bucket 124 is being carried on the boom 140, the bucket 124 may be held at level to restrict the load from spilling out. Such levelling may be performed by balancing out a tension between a hoisting rope 168 and a drag rope 176 of the rope mechanism 148. To empty the bucket 124, a tension on the drag rope 176 may be reduced to allow a front of the bucket 124 to drop. As exemplarily shown, the hoisting rope 168 may be trained over a pulley 172 provided at the end 164 of the boom 140 to suspend the bucket 124 therefrom. The drag rope 176 may be coupled to the bucket 124 in an operating manner, as is customary, e.g., to level or angle the bucket 124 in order to carry and/or release the load. Operational devices such as winches and/or drums (not shown) may be provided within the machinery or the enclosure 136 for the operation of the rope mechanism 148, and thus, of the bucket 124.

In some embodiments, parts of the rope mechanism 148 may also be applicable for a lowering of the boom 140 (e.g., for maintenance and/or service). To this end, the rope mechanism 148 may include boom suspension ropes 156 (e.g., which may be of a fixed length) trained over a tri-structure 160 of the work machine 100. As an example, when lowering the boom 140, a temporary rope (not shown) may be set or rigged over a top of the tri-structure 160 and attached to a rear of the boom suspension ropes 156, which may enable the boom 140 and the boom suspension ropes 156 to be lowered together. Although not limited, the rope mechanism 148 may be, at least in part, operated by accessing one or more input devices provided within an operator cabin 152 mounted on the frame 120 of the work machine 100.

Figure 2:
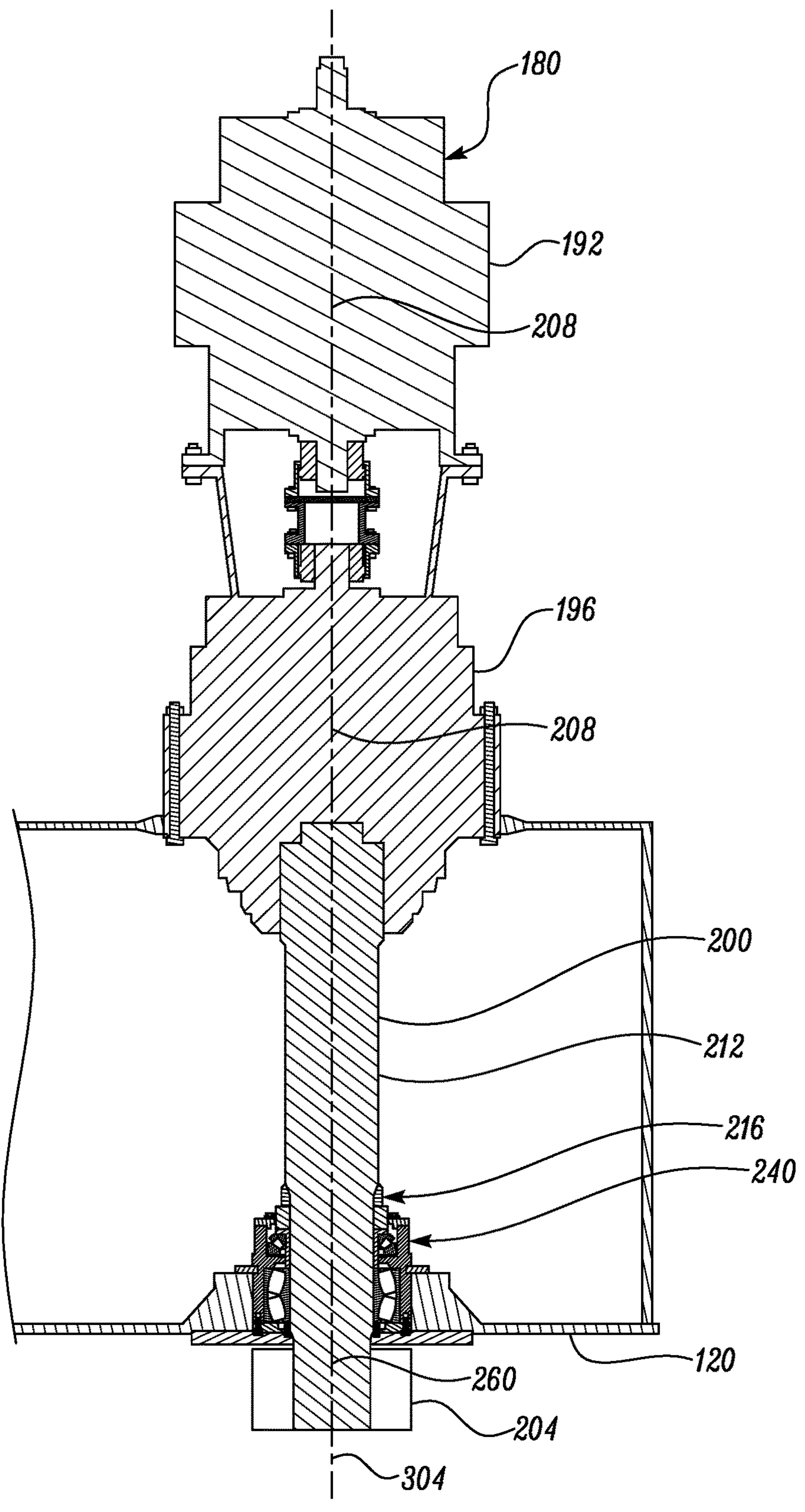
FIG. 2 is a cross-sectional view of an exemplary powertrain associated with the work machine of FIG. 1, in accordance with an embodiment of the present disclosure.

Referring to FIGS. 1 and 2, the work machine 100 may further include a power system or a powertrain 180, as shown, to power an operation or a swinging movement of the frame 120 with respect to the base 116. In this regard, the frame 120 may be rotatably connected by means of a journal or an axle (discussed as driveshaft 200 further below) with the base 116 for a rotary driving or a swinging of the frame 120 relative to the base 116. In this regard, the base 116 may include a rack 188 and the frame 120 (e.g., in conjunction with the enclosure 136) may enclose (most part of) the powertrain 180. The powertrain 180 may include a power source 192, a transmission 196, and a driveshaft 200, as shown in FIG. 2, with the transmission 196 configured to transmit power (e.g., rotary power) from the power source 192 to the driveshaft 200. The driveshaft 200 may include a pinion 204 which may engage with the rack 188 of the base 116. By way of such an arrangement, a powering of the driveshaft 200 (by the power source 192) or a motion imparted to the pinion 204 (by the power source 192) may result in a rotation of the frame 120 relative to the base 116 as the pinion 204 may move in conjugation with the rack 188.

Figure 3:
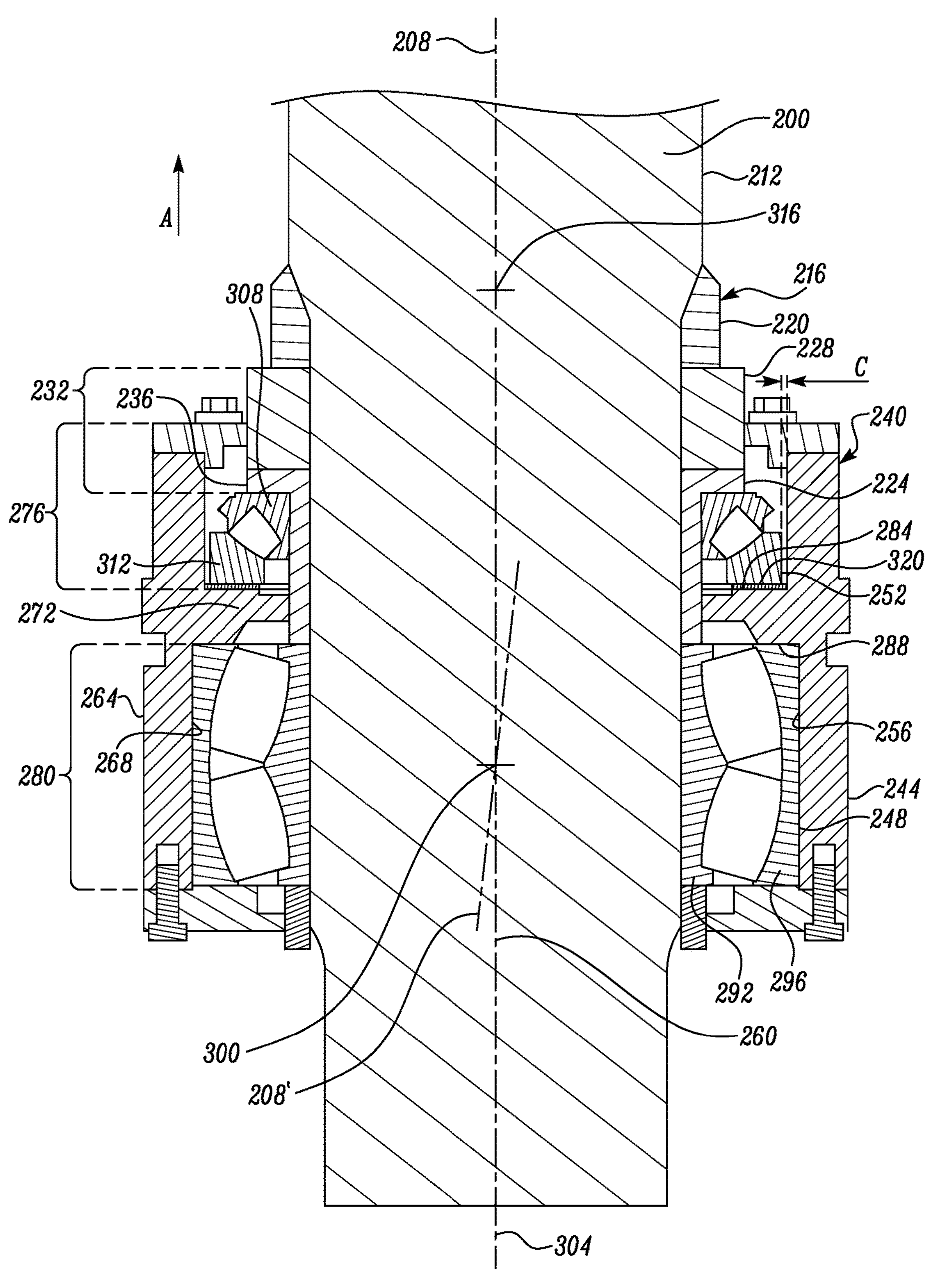
FIG. 3 is an enlarged view of a portion of the powertrain illustrating a bearing assembly for a driveshaft of the powertrain, in accordance with an embodiment of the present disclosure.

Referring to FIGS. 2 and 3, the driveshaft 200, exemplarily in conjunction with the pinion 204, may define a driveshaft axis or a longitudinal axis 208 about which the driveshaft 200 (and the pinion 204) may rotate during operations and/or during the swinging movement of the frame 120 with respect to the base 116. Although not limited, the driveshaft 200 may include varying cross-section, e.g., when the driveshaft 200 is viewed in a plane passing along the longitudinal axis 208 (see FIG. 3). For example, and in this regard, the driveshaft 200 may include a shoulder 212 extending radially outwardly from a remaining body of the driveshaft 200. In some embodiments, the powertrain 180 may include an engagement assembly 216 that may engage with a portion of the shoulder 212. The engagement assembly 216 may include a sleeve 220, a collar 224, and an annular ring 228, as shown.

The sleeve 220 may abut against a section of the shoulder 212 so as to be restricted from moving along the driveshaft 200 at least in one direction (e.g., upward direction-see direction, A, i.e., towards the power source 192); the annular ring 228 may sit against the sleeve 220 and may protrude generally radially with respect to the driveshaft 200 (e.g., further outwardly than the radial extension of the shoulder 212); and the collar 224 may be supported against the annular ring 228. Combinedly, a ledge portion 232 (see FIG. 3) of the engagement assembly 216, formed at least in part by the annular ring 228 and the collar 224 (e.g., by a flange 236 of the collar 224), may be defined to extend outwards (e.g., radially outwards) from the driveshaft 200. Although the engagement assembly 216 may include multiple parts as described above, in some embodiments, the ledge portion 232 may be formed integrally with the driveshaft 200.

Referring to FIG. 3, further disclosure below corresponds to and/or includes description of a bearing assembly 240 for the driveshaft 200. As shown in FIG. 3, the bearing assembly 240 is generally interfaced between the driveshaft 200 and the frame 120 to allow (e.g., freely or smoothly allow) the driveshaft 200 to move or rotate with respect to the frame 120 about the longitudinal axis 208. In so doing, the bearing assembly 240 may facilitate the swinging movement of the frame 120 with respect to the base 116. The bearing assembly 240 may include a housing 244, a spherical bearing 248, and a thrust bearing 252.

The housing 244 may be fixedly engageable (e.g., by fastening and/or by welding) with the frame 120. The housing 244 may include a rigid structure and thus may be made from a material such as industrial grade steel, iron, and the like materials, including alloys. The housing 244 may define a cavity 256. The cavity 256 may include or correspond to a through-cavity (i.e., open from least two sides) to provide passage (e.g., rotatable passage) to the driveshaft 200 therethrough or through the housing 244. The cavity 256 may define a cavity axis 260. An accommodation or passage of the driveshaft 200 within and/or through the cavity 256 may be such that the cavity axis 260 may align with the longitudinal axis 208 of the driveshaft 200.

In further detail, the housing 244 may include an outer wall portion or simply, a wall portion 264, which may exemplarily include an annular or a cylindrical profile. The wall portion 264 of the housing 244 may define an inner surface 268 that extends (e.g., annularly and uninterruptedly) around the cavity 256 to define the cavity 256. The housing 244 may also include a step portion 272 that may extend inwards (e.g., radially inwards) from the inner surface 268 of the wall portion 264 into the cavity 256. By way of such extension of the step portion 272, the cavity 256 may be indented by the step portion 272, thereby defining a cavity indenture. Although not limited, the step portion 272 may extend annularly (e.g., and also continuously) around the cavity 256, e.g., on and along the inner surface 268 of the wall portion 264, generally dividing the cavity 256 into a first cavity part 276 and a second cavity part 280.

The first cavity part 276 may be defined relatively upwards or relatively closer to the power source 192 while the second cavity part 280 may be defined relatively downwards or relatively closer to the base 116. In other words, the first cavity part 276 may be situated above the second cavity part 280. Also, the step portion 272 may define a first axial surface 284 and a second axial surface 288 opposite to the first axial surface 284. The first axial surface 284 may delimit a portion of the first cavity part 276 while the second axial surface 288 may delimit a portion of the second cavity part 280.

The spherical bearing 248 may facilitate a rotation of the driveshaft 200 within the cavity 256. To this end, the spherical bearing 248 may be engaged with the housing 244, e.g., within the second cavity part 280 of the cavity 256 of the housing 244. The spherical bearing 248 may also be engaged with the driveshaft 200 for journaling the driveshaft 200 with respect to the cavity 256, and thus, with respect to the housing 244. The spherical bearing 248 may include a spherical inner race 292 and a spherical outer race 296. The spherical inner race 292 may be configured to be press-fitted with the driveshaft 200 while the spherical outer race 296 may be configured to be in sliding-fit with the housing 244 (e.g., to the inner surface 268 defined by the wall portion 264 of the housing 244). Also, the spherical bearing 248 may be a spherical roller bearing as shown, e.g., which may include rollers disposed suitably between the spherical inner race 292 and the spherical outer race 296, such that the spherical inner race 292 may operably move with respect to the spherical outer race 296. The spherical bearing 248 may define a first spherical center 300. The sliding-fit of the spherical outer race 296 with respect to the housing 244 provides freedom to the spherical outer race 296 to move up and down (e.g., vertically or axially along the longitudinal axis 208) within the housing 244 to follow the spherical inner race 292 and/or the rollers positioned therebetween.

In an assembly of the spherical bearing 248 with the housing 244, the cavity axis 260 may pass through the first spherical center 300. Further, as the cavity axis 260 may be aligned with the longitudinal axis 208 of the driveshaft 200, the first spherical center 300 may be aligned with the longitudinal axis 208 of the driveshaft 200, as well. In other words, the longitudinal axis 208 may pass through the first spherical center 300, as well. Therefore, the rotation of the driveshaft 200 within the cavity 256 of the housing 244 may be facilitated about the longitudinal axis 208 of the driveshaft 200. Moreover, the rotation of the driveshaft 200 may be facilitated about the cavity axis 260 and/or the first spherical center 300 of the spherical bearing 248, as well.

Also, as the first spherical center 300 may be aligned with the cavity axis 260 and/or the longitudinal axis 208, the spherical bearing 248 may facilitate (or accommodate) an angulation of the driveshaft 200 within the cavity 256 about the first spherical center 300 and/or with respect to a reference axis 304. An angulation of the driveshaft 200 may refer to a condition of the driveshaft 200 in which the longitudinal axis 208 and/or at least a portion of the driveshaft 200 (e.g., a rotating driveshaft) may tilt, sway, or vary radially away from the cavity axis 260 to annul its alignment with the cavity axis 260 and be tilted or swayed exemplarily according to a longitudinal axis 208 (see FIG. 3). Such tilting or swaying of the longitudinal axis 208 may occur about the first spherical center 300. It may be noted that the reference axis 304, in such a case, may be one and the same as the cavity axis 260, as shown.

Effectively, the spherical bearing 248, apart from facilitating the rotation of the driveshaft 200 with respect to the housing 244, may also facilitate the angulation of the driveshaft 200. In either of the rotation or the angulation of the driveshaft 200 within the cavity 256 and with respect to the housing 244, the longitudinal axis 208 and the cavity axis 260 (or the reference axis 304) may each remain aligned with the first spherical center 300 such that they each independently pass through the first spherical center 300. Such angulation afforded by the spherical bearing 248 to the driveshaft 200 may allow the driveshaft 200 and/or the spherical bearing 248 to accommodate radial loads exerted thereon and/or on other components, e.g., the pinion 204, during operations (e.g., during the swinging movement of the frame 120 with respect to the base 116).

The thrust bearing 252 may be engaged with the housing 244, e.g., within the first cavity part 276 of the cavity 256 of the housing 244. In that manner, the thrust bearing 252 may be located at an elevation with respect to the spherical bearing 248, along the longitudinal axis 208. The thrust bearing 252 may also be engaged with or supported against the driveshaft 200 for allowing the driveshaft 200 to journal in the cavity 256. In further detail, the thrust bearing 252 may include a thrust inner race 308 and a thrust outer race 312. The thrust outer race 312 may rest on the step portion 272 (e.g., on the first axial surface 284 of the step portion 272) to enable the thrust bearing 252 to be supported against the housing 244. The thrust inner race 308 may abut with the ledge portion 232 extending from the driveshaft 200 to enable the thrust bearing 252 to be supported against the driveshaft 200. The thrust bearing 252 may include rollers (as shown in FIG. 3) disposed suitably between the thrust inner race 308 and the thrust outer race 312, such that the thrust inner race 308 may operably move with respect to the thrust outer race 312.

By way of an engagement of the thrust bearing 252 with the housing 244 and the driveshaft 200, as described herein, the thrust bearing 252 may accommodate the angulation of the driveshaft 200 about the reference axis 304 (or about the cavity axis 260) and a rotation of the driveshaft 200 within the cavity 256 about the longitudinal axis 208. Additionally, the thrust bearing 252 may also accommodate (or isolate) a load (e.g., an axial load) exerted or passing along the longitudinal axis 208 away from the spherical bearing 248 onto (e.g., to dissipate onto) either of the housing 244 and/or the frame 120 (since the housing 244 may be immovably coupled with the frame 120).

In this regard, it may be noted that the thrust inner race 308 of the thrust bearing 252 operatively impinges with the thrust outer race 312 of the thrust bearing 252 under at least a component of a weight of the driveshaft 200 and/or a load exerted upon the step portion 272 (e.g., any load acting through the driveshaft 200 or along the longitudinal axis 208) through the ledge portion 232 of the driveshaft 200. With regard to such axial loads, it may be noted that the spherical outer race 296 of the spherical bearing 248 may be in sliding-fit against the inner surface 268 of the housing 244, in a manner that renders the spherical bearing generally free (e.g., without any obstruction) to move axially (e.g., vertically) with respect to the housing 244, thereby preventing the spherical bearing 248 from being loaded axially or vertically.

According to one or more aspects of the present disclosure, the thrust bearing 252 may be a thrust spherical roller bearing that may define a second spherical center 316. Although not limited, the second spherical center 316 may be different or located away from the first spherical center 300. As the thrust bearing 252 may be situated above the spherical bearing 248, the second spherical center 316 may be located above the first spherical center 300.

In some embodiments, the thrust bearing 252 defines an annular clearance, C, with respect to the inner surface 268 (or to the portion of the inner surface 268 that delimits the first cavity part 276) of the housing 244 to allow a position change of the thrust bearing 252 (e.g., a minimal displacement radially on and along the first axial surface 284) during the angulation of the driveshaft 200. This enables the thrust bearing 252 to move (e.g., generally freely radially) with the angulation of the driveshaft 200, generally easily accommodating the angulation of the driveshaft 200, as said angulation may occur with respect to the reference axis 304 (or the cavity axis 260). Accommodating such angulation also implies that the thrust bearing 252 may also accommodate the radial loads that may accompany the angulation. This in turn prevents the thrust bearing 252 from being loaded radially.

In some embodiments, the bearing assembly 240 includes one or more wear plates, e.g., see wear plate 320. The wear plate 320 may be positioned in between the housing 244 and the thrust bearing 252 or in between the thrust outer race 312 and the first axial surface 284 of the step portion 272. The wear plate 320 may serve as a sacrificial element that may wear out because of factors, such as repeated or frequent movement/displacement (e.g., radially) of the thrust bearing 252 over a period owing to driveshaft angulation.

INDUSTRIAL APPLICABILITY

During operation, as the power source 192 may be activated to enable a swinging movement between the frame 120 and the base 116, the power source 192 may provide rotary power to the driveshaft 200 such that the driveshaft 200 (along with the pinion 204) may rotate about the longitudinal axis 208. As the pinion 204, engaged with the driveshaft 200, may be operatively engaged and disposed in conjugation with the rack 188 at the base 116 of the work machine 100, a rotation of the driveshaft 200 and the pinion 204 may result in a consequential movement of the pinion 204 with respect to the rack 188. In effect, the frame 120 may move or swing with respect to the base 116.

During such swinging movements of the frame 120 with respect to the base 116, various loads may act upon the driveshaft 200, and thus on the bearing assembly 240 that rotatably couples the driveshaft 200 to the frame 120. A load, attributed by factors such as a weight of the driveshaft 200, reactive forces arising from the operative engagement between the pinion 204 and the rack 188, etc., often subjects components surrounding the driveshaft 200, such as the bearing assembly 240 itself, with operational stresses. Components of such operational stresses may act both axially and radially with respect to the driveshaft 200. Such stresses may cause the driveshaft 200 (e.g., a rotating driveshaft) to be displaced or moved (e.g., minimally) both axially and the radially. Therefore, apart from sustaining vertical or axial loads, the driveshaft 200 may also sustain loads from angulation about the reference axis 304.

Given the configuration of the bearing assembly 240 as discussed above—e.g., having the thrust bearing 252 positioned at an elevation (e.g., along the longitudinal axis 208) with respect to the spherical bearing 248, having the annular clearance, C, defined between the thrust bearing 252 and the inner surface 268 of the housing 244, and (optionally) having the first spherical center 300 located away from the second spherical center 316, the thrust bearing remains free to be moved (e.g., minimally radially) with the angulation or the radial movement of the driveshaft 200. In that manner, the thrust bearing 252 and/or various parts of the bearing assembly 240 are prevented from being loaded radially.

Moreover, as the spherical outer race 296 of the spherical bearing 248 may be free to move axially (or vertically), the spherical bearing 248 and/or various parts of the bearing assembly 240 are prevented from being loaded axially or vertically (e.g., along the longitudinal axis 208). Effectively, the spherical bearing 248 may suitably resist or accommodate radial loads while the thrust bearing 252 may suitably resist or accommodate axial (or vertical) loads, in turn increasing a usable work life of the bearing assembly 240, as a whole, along with enhancing the overall reliability of the driveshaft 200 and various parts and components that surround the driveshaft 200.

If the work machine 100 (or a conventional dragline) were required to be converted from an initial work state to an updated work state (e.g., in which the aforesaid swinging mechanism is to be incorporated), the configuration of the powertrain 180, having the thrust bearing 252 positioned at an elevation with respect to the spherical bearing 248, is attainable with relative ease, less effort, and without incorporating excessive changes to the work machine 100. In some embodiments, and without limitation, it is possible for the thrust bearing 252 to be positioned below the spherical bearing 248, as well. Further, in some embodiments, and without limitation, it is possible for the second spherical center 316 of the thrust bearing 252 to be aligned with the first spherical center 300 of the spherical bearing 248.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A bearing assembly for a driveshaft facilitating a swinging movement of a frame of a dragline with respect to a base of the dragline, the bearing assembly comprising:

a housing fixedly engageable with the frame and defining a cavity to provide rotatable passage to the driveshaft therethrough;

a spherical bearing engageable with each of the housing and the driveshaft for journaling the driveshaft in the cavity and facilitating a rotation of the driveshaft about a longitudinal axis and an angulation of the driveshaft with respect to a reference axis; and a thrust bearing configured to be supported against each of the driveshaft and the housing, and defining an annular clearance with respect to the housing, to accommodate the angulation of the driveshaft and an axial load passing along the longitudinal axis away from the spherical bearing onto either of the housing or the frame.

2. The bearing assembly of claim 1, wherein the thrust bearing is located at an elevation with respect to the spherical bearing along the longitudinal axis.

3. The bearing assembly of claim 1, wherein the thrust bearing includes a thrust inner race and a thrust outer race, the housing includes a wall portion defining an inner surface extending around the cavity and a step portion extending radially from the inner surface of the wall portion into the cavity, the thrust outer race rests on the step portion to enable the thrust bearing to be supported against the housing, and the thrust inner race abuts with a ledge portion extending from the driveshaft to enable the thrust bearing to be supported against the driveshaft.

4. The bearing assembly of claim 3, wherein the thrust inner race operatively impinges with the thrust outer race under at least a component of a weight of the driveshaft and/or a load acting through the driveshaft exerted upon the step portion of the housing through the ledge portion extending from the driveshaft.

5. The bearing assembly of claim 1, wherein the spherical bearing includes a spherical inner race and a spherical outer race, the spherical inner race is configured to be press-fitted with the driveshaft and the spherical outer race is configured to be in sliding-fit with the housing.

6. The bearing assembly of claim 1, wherein the cavity defines a cavity axis, and the driveshaft is configured to pass through the cavity such that the longitudinal axis aligns with the cavity axis.

7. The bearing assembly of claim 1 further including one or more wear plates configured to be positioned in between the housing and the thrust bearing.

8. The bearing assembly of claim 1, wherein the spherical bearing is a spherical roller bearing defining a first spherical center; and the thrust bearing is a thrust spherical roller bearing defining a second spherical center.

9. The bearing assembly of claim 8, wherein the first spherical center is different or away from the second spherical center.

10. A dragline, comprising:

a base;

a frame disposed above the base;

a power system including a driveshaft to facilitate a swinging movement of the frame with respect to the base; and a bearing assembly for the driveshaft, the bearing assembly including:

a housing fixedly engageable with the frame and defining a cavity to provide rotatable passage to the driveshaft therethrough;

a spherical bearing engageable with each of the housing and the driveshaft for journaling the driveshaft in the cavity and facilitating a rotation of the driveshaft about a longitudinal axis and an angulation of the driveshaft with respect to a reference axis; and a thrust bearing configured to be supported against each of the driveshaft and the housing, and defining an annular clearance with respect to the housing, to accommodate the angulation of the driveshaft and an axial load passing along the longitudinal axis away from the spherical bearing onto either of the housing or the frame.

11. The dragline of claim 10, wherein the thrust bearing is located at an elevation with respect to the spherical bearing along the longitudinal axis.

12. The dragline of claim 10, wherein the driveshaft includes a ledge portion extending therefrom, the thrust bearing includes a thrust inner race and a thrust outer race, the housing includes a wall portion defining an inner surface extending around the cavity and a step portion extending radially from the inner surface of the wall portion into the cavity, the thrust outer race rests on the step portion to enable the thrust bearing to be supported against the housing, and the thrust inner race abuts with the ledge portion to enable the thrust bearing to be supported against the driveshaft.

13. The dragline of claim 12, wherein the thrust inner race operatively impinges with the thrust outer race under at least a component of a weight of the driveshaft and/or a load acting through the driveshaft exerted upon the step portion of the housing through the ledge portion extending from the driveshaft.

14. The dragline of claim 10, wherein the spherical bearing includes a spherical inner race and a spherical outer race, the spherical inner race is configured to be press-fitted with the driveshaft and the spherical outer race is configured to be in sliding-fit with the housing.

15. The dragline of claim 10, wherein the cavity defines a cavity axis, and the driveshaft is configured to pass through the cavity such that the longitudinal axis aligns with the cavity axis.

16. The dragline of claim 10 further including one or more wear plates configured to be positioned in between the housing and the thrust bearing.

17. The dragline of claim 10, wherein the spherical bearing is a spherical roller bearing defining a first spherical center; and the thrust bearing is a thrust spherical roller bearing defining a second spherical center.

18. The dragline of claim 17, wherein the first spherical center is different or away from the second spherical center.

19. A bearing assembly for a driveshaft facilitating a swinging movement of a frame of a dragline with respect to a base of the dragline, the bearing assembly comprising:

a housing fixedly engageable with the frame and defining a cavity to provide rotatable passage to the driveshaft therethrough;

a spherical bearing engageable with each of the housing and the driveshaft for journaling the driveshaft in the cavity and facilitating a rotation of the driveshaft about a longitudinal axis and an angulation of the driveshaft with respect to a reference axis;

a thrust bearing configured to be supported against each of the driveshaft and the housing to accommodate the angulation of the driveshaft and an axial load passing along the longitudinal axis away from the spherical bearing onto either of the housing or the frame; and one or more wear plates configured to be positioned in between the housing and the thrust bearing.

20. The bearing assembly of claim 19, wherein the thrust bearing includes a thrust inner race and a thrust outer race, the housing includes a wall portion defining an inner surface extending around the cavity and a step portion extending radially from the inner surface of the wall portion into the cavity, the thrust outer race rests on the step portion to enable the thrust bearing to be supported against the housing, and the thrust inner race abuts with a ledge portion extending from the driveshaft to enable the thrust bearing to be supported against the driveshaft.

* * * * *